June 22, 1943.  S. A. SCHERBATSKOY  2,322,478
WELL SURVEYING METHOD AND APPARATUS
Filed May 28, 1940   3 Sheets-Sheet 1
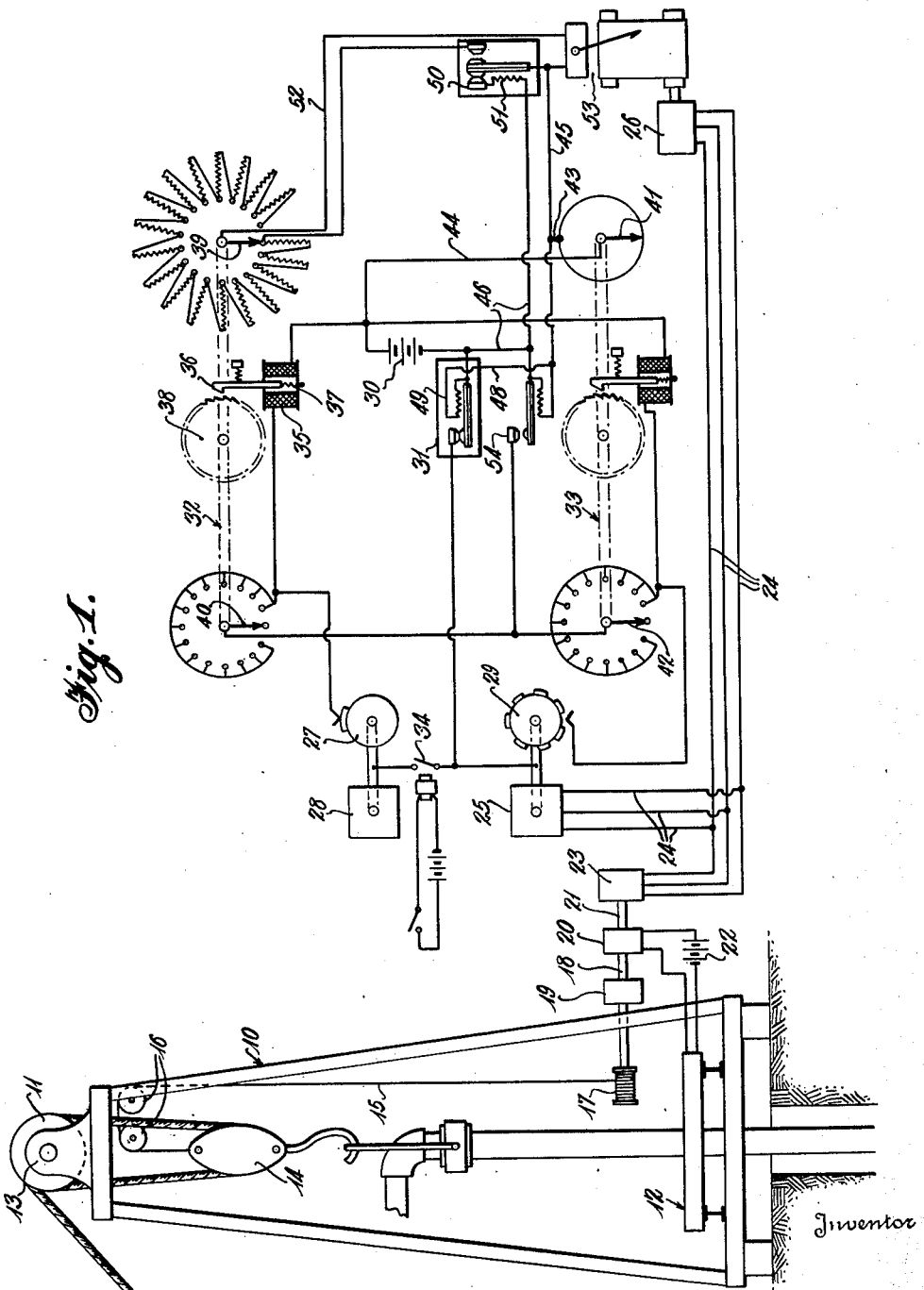

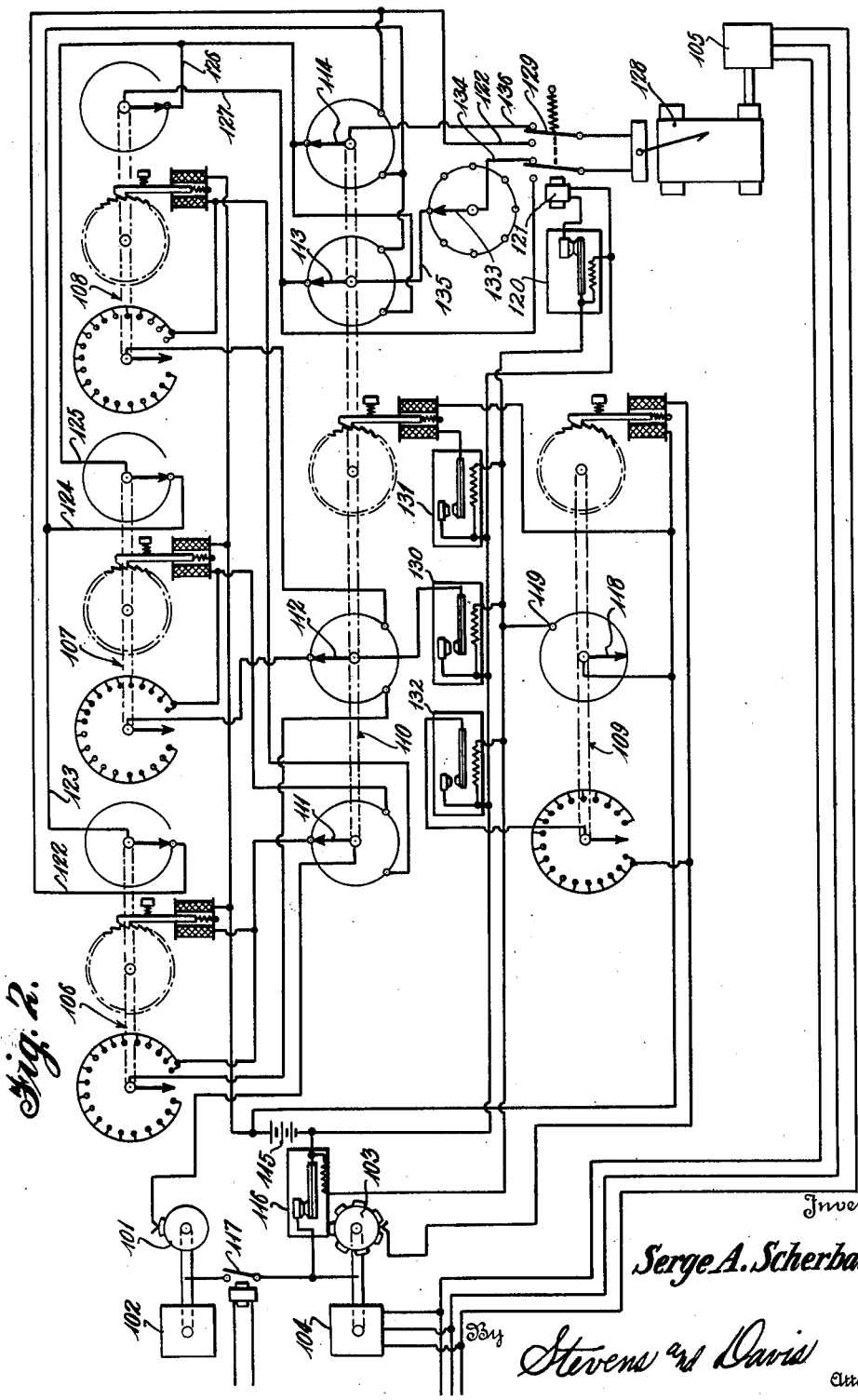

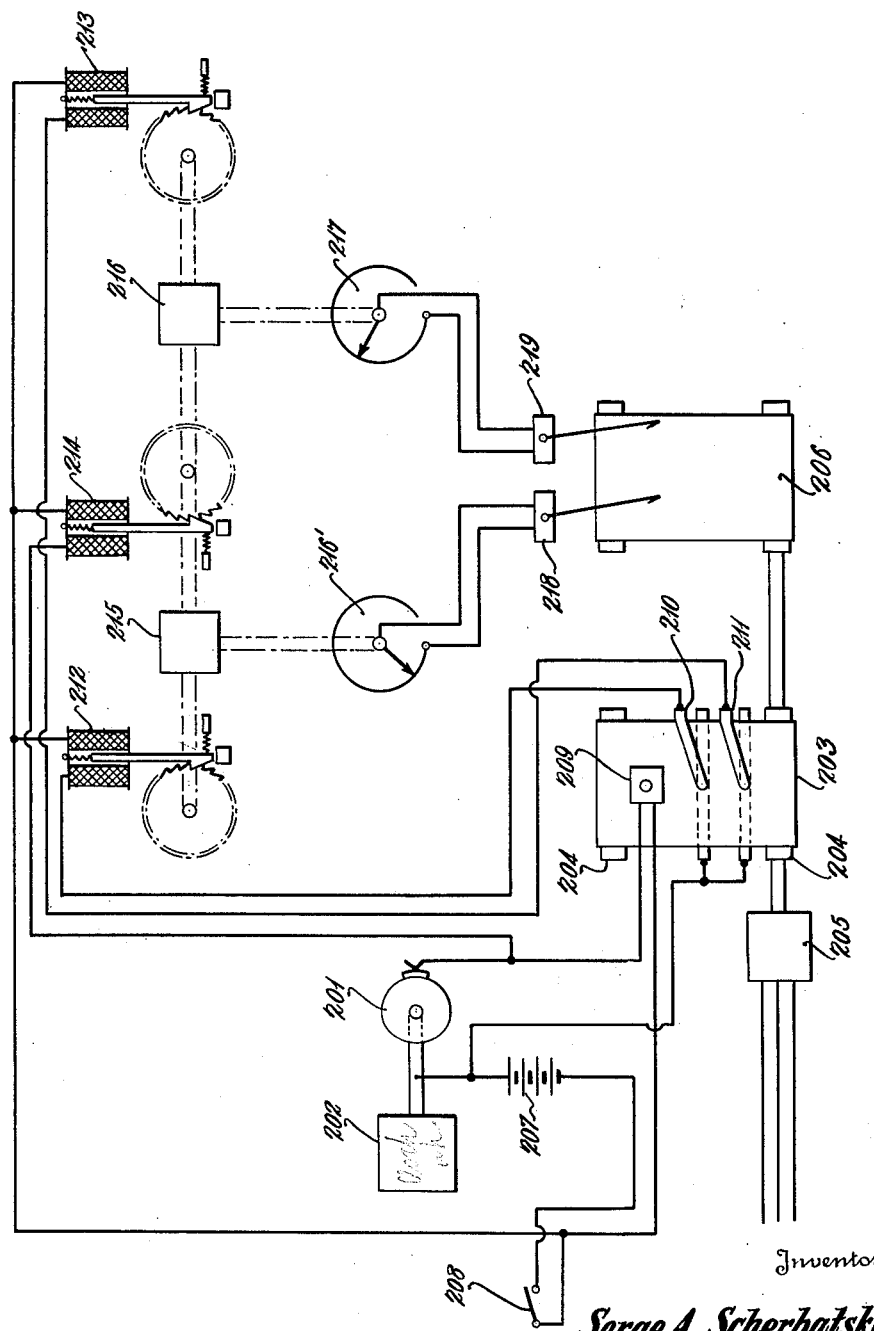

Patented June 22, 1943

2,322,478

UNITED STATES PATENT OFFICE 2,322,478

WELL SURVEYING METHOD AND APPARATUS

Serge Alexander Scherbatskoy, Tulsa, Okla., assignor to Well Surveys, Incorporated, Tulsa, Okla., a corporation of Delaware Application May 28, 1940, Serial No. 338,548

3 Claims. (Cl. 234—36.5)

This invention relates to an apparatus for measuring the rate of progress of an operation such as the drilling of an oil well. More particularly it relates to an apparatus for measuring the amount of time necessary for the drill to progress per unit of depth and for recording the measurements so made in correlation with simultaneously made determinations of the depth at which the drill is working.

In the drilling of oil wells it is common practice for those familiar with the drilling operation to make rough approximations of the speed at which the drill is progressing and from these approximations to make rather good guesses as to the type of material being penetrated. Since it is highly desirable, however, that the nature of the various strata being penetrated and their respective depths below the surface of the earth be known more accurately, need has long been felt for a more accurate and scientific means for determining the rate of progress of a drill through the various formations which it encounters and the correlation of this measurement with indications of the exact depth at which the various measurements are taken.

Means have already been proposed to measure the progress of the drill by measuring the movement of the traveling block of a drill rig while the drill is suspended from it and disconnecting the measuring mechanism or rendering it inoperative the moment the drill is clamped in the rotary table and released from the traveling block. By this method and means the progress of the drill and the drilling operation may be accurately measured without at the same time measuring the movements of the traveling block that are made in the process of attaching a new section of the drill stem or for other purposes.

A method and means for accomplishing this measurement are fully described in the United States Patent 2,166,212 granted on July 18, 1939 to John T. Haywood. The present application contemplates the use of such a method and device for ascertaining the movement of the drill in the well but that device in itself is not part of the present invention. A device for measuring the length of pipe lowered into a well and patented by Lyle Dillon et al. on March 12, 1935 in Patent No. 1,993,877 may also be used as the measuring mechanism to measure the rate of progress of the drill according to this invention.

The present invention has for its purpose the conversion of the aforementioned measurements of the progress of the drill in the well bore into measurements of the rate of progress of the drilling operation and the correlation of this data with determinations of the actual position of the drill at the time of each measurement. Thus, as the aforementioned measuring device indicates to the device of the present invention the progress of the drill through a unit of depth, the device of the present invention will measure the time consumed by this progress and record it in correlation with a determination of the depth at which the drill is operating.

In a more advanced type of device according to the present invention time determinations may be made simultaneously for two or more units of depth of different lengths so that the record will, for example, show the progress of the drill over a relatively long unit of depth, thus eliminating minor variations, and over a relatively short unit of depth thus disclosing minor variations but perhaps obscuring more general trends.

In a general way the present device comprises means to measure time and means to combine the time measurement with a measurement of drilling progress to give a measurement of rate of drilling. More specifically, it has been found desirable to record the measurements of rate of drilling in correlation with determinations of depth, and in order to do this it has been found preferable to record the rate of drilling in terms of the length of time necessary to drill a unit of depth. Thus the present device is arranged to be controlled by the progress indications so that the completion of a unit of progress causes an indication of the time which was consumed in the making of the progress to be taken from the time measuring part of the device and recorded by a recorder, on a recording tape that is driven in accordance with the movements of the drill in the well so that the indication of rate of progress will be directly correlated with an indication of the depth of the drill in the well.

The preferred embodiment of the present invention consists of a variable resistance, means to progressively increase the resistance with the passage of time, means to record the amount of resistance after a unit of depth progress has been indicated and means to reset the variable resistance to a zero or base position after the recording has been made. The recorder is driven directly from the instrument measuring the progress of the drill and hence records the indication of rate of progress in correlation with an indication of the depth at which the drill is working. In most instances it has been found desirable to provide a means for stopping the timing device whenever the drill stops drilling and starting it again when the drill starts drilling again thus making the measurement an accurate indication of the time taken to drill a unit distance while the drill is actually at work.

For measuring the rate of progress simultaneously over more than one unit of depth two separate measuring devices may be used but it is preferable to use instead only a single measuring device and so arrange it that the record is made both of the last small unit of depth and of the last several small units of depth with the same equipment. For this purpose a series of variable resistors may be utilized and the resistance of these resistors increased progressively, one after the other, by a timing mechanism. By proper arrangement of relays, switches, the timing mechanism is progressively connected to one resistance after another, each resistance being brought back to its zero or base resistance just prior to the connecting of the timing device thereto as a small unit of depth is completed. The resistance across the last resistor varied by the timing device may be recorded at the appropriate time as an indication of the time consumed in drilling the last unit and the resistance across the whole series of resistances may be recorded, also, of course, at the appropriate time, as an indication of the time consumed in the drilling of the last larger unit of depth. Thus from a single set of resistors there may be obtained both types of information desired and these two types of data may be expediently recorded side by side on a single record sheet.

Reference to the following detailed description of four embodiments of this device which are illustrated in the accompanying drawings will furnish a more complete understanding of the many details and advantages of the present invention.

In Figure 1 of the accompanying drawings there is shown diagrammatically a form of the present device adapted to the measurement of the rate of drilling over units of depth of a single size;

In Figure 2 of the drawings there is diagrammatically illustrated a more complicated form of the present invention which is adapted to measure both the time it takes to drill a small unit of depth and also the time it takes to drill a relatively large unit of depth; and In Figure 3 of the drawings there is diagrammatically illustrated a device that operates continuously rather than in steps to accomplish the same purpose.

The device of Figure 1 of the drawings is adapted to continuously but in a step by step manner record the rate of drilling in correlation with an indication of the depth of the drill. This device uses three switches of the type ordinarily found in automatic telephone circuits. Such switches are multicontact switches and each switch has as many switch arms and sets of contacts or as many poles as desired. The actuating mechanism for the switch is separate from the switch circuit and is so arranged that when the current is applied through one of its circuits the switch is advanced one step whereas if the current is applied through another of its circuits the switch is advanced until the contacting arm or arms reach a home or base position. Thus by properly applying currents to the switch, the switch may either be advanced progressively a step at a time or it may be returned to the home or base position so that it will start again from that position. As illustrated the device is applied to the usual type of drill rig used for drilling oil wells. Such a drill rig generally consists of a derrick 10 supporting a tackle 11 for raising or lowering the drill and/or casing, and a rotary table 12 for rotating the drill to drive it. The tackle 11 generally consists of a crown block 13 and a traveling block 14 connected by the usual cable through which power is supplied to support the drill stem or casing, which is suspended by a hook from the traveling block. The rotary table is rotated by a source of power which has not been shown in the drawings and when rotated rotates the drill to accomplish the boring operation. The rotary table also has jaws for clamping the drill stem so that it can support the drill when it becomes desirable to detach the tackle from it, as for example, to attach an additional length of drill stem.

In applying the present invention to such a drill rig a cable 15 is fastened to the traveling block and passed over pulleys 16 fixed above the traveling block on a derrick frame and then downward and around a cable reel 17 carried by shaft 18. On the shaft 18 is a spring winding means 19 that continually keeps the cable reel wound tightly so that it will accurately follow the movements of the traveling block.

At one end of the shaft 18 is a magnetic clutch 20 which joins the shaft 18 to a shaft 21. This clutch is arranged to be disengaged by power from a battery 22 whenever the clamping jaws of the rotary table are operated to clamp the drill stem in the table. Switching mechanism for this purpose has not been specifically shown but is disclosed in United States Patent No. 1,993,877 granted March 12, 1935 to Lyle Dillon et al. and United States Patent No. 2,166,212 granted July 18, 1939 to John T. Haywood. However, any switch that will be operated when the clamping members of the rotary table are brought into operative relation to the drill stem may be used, the switch merely being connected so as to apply the voltage from battery 22 to the magnetic switch 20 to cause it to disengage.

The purpose of this magnetic clutch 20 is to eliminate from the measurements to be made the movements of the traveling block that are not coincident with the lowering of the drill into the well. At many times during the drilling operation the traveling block will be disengaged from the drill for various purposes, for example, to connect a new section of drill stem onto the sections already in use. These movements are not indicative of the progress of the drilling operation and hence are eliminated from the measurements being made.

The shaft 21 is used to operate the measuring apparatus either directly or through a transmission system of some kind. In the present instance it has been shown as operating through an electrical transmission system of the "Selsyn" type, in which the shaft 21 drives a generator 23 and the output of the generator through electrical connections 24 drives a pair of motors 25 and 26 which operate the measuring apparatus. The advantage of the electrical transmission system is that it permits the measuring apparatus to be at some distance from the drill rig and to have a very flexible connection therewith.

The measuring apparatus operates in response to electrical pulses from two sources. First there are timed electrical pulses generated by a time commutator or contactor 27 driven by a clock motor or a synchronous electrical motor or some other suitable constant speed device 28. Secondly, there is a progress commutator or contactor 29 driven by one of the motors 25 of the electrical transmission system. In circuit with both of the commutators 27 and 29 is a battery or other sort of suitable source of power 30 and a time delay cut-out switch 31 which is normally closed. This function of this switch will be later explained.

The circuits of the two commutators 27 and 29 are common insofar as the battery 30 and cut-out switch 31 are concerned but the commutators have their respective circuits completed through the operating mechanism of different multicontact switches. These switches are of the type already mentioned. The switch for the timing commutator 27 has been assigned the numeral 32 and the one for the depth indicating commutator 29 the numeral 33.

In addition the circuit of the timing commutator 27 contains a switch 34 that is arranged to be magnetically operated and is closed only when the drill is being rotated in the course of actual drilling.

Assuming that drilling is in progress and the switch 34 is closed an impulse from the battery 30 will be sent to the actuating mechanism of the multicontact timing switch 32 each time the timing contactor 27 makes contact. This actuating mechanism consists of a solenoid coil 35 which moves a pawl 36 formed on the solenoid core downward against the action of a spring 37 to rotate a ratchet 38 fixed to the shaft of the multicontactor switch. As soon as the commutator 27 breaks the circuit spring 37 returns the solenoid core to its original position so that it is ready to move the ratchet another step upon the next energization.

Similarly, the completion of the circuit of the progress commutator 29 by that commutator advances the multicontact progress switch 33 by operation of the corresponding solenoid and ratchet drive mechanism.

In order to expedite the showing of the electrical connections to the multicontactor switches 32 and 33 these switches have been shown in three parts connected by dotted lines to show that the switch arms and ratchet of each switch operate together. Thus as the ratchet 38 of the switch 32 is advanced a movable arm 39 of that switch advances. As will be evident from the drawings, resistances have been connected between the fixed contacts that cooperate with this contact arm so that each step that the switch advances, increases the resistance in series with the arm. At the same time the movable contactor 40 advances along its series of fixed contacts. All but one of these latter contacts are connected together for a purpose that will later be described.

The multicontactor progress switch 33 also has two moving contactors 41 and 42. Of the fixed contacts with which one of the contactors 41 contacts, however, only one, 43, is utilized and the remainder may be removed or left disconnected. Of the fixed contacts that cooperate with the other contactor 42, however, all except one are connected together as are those cooperating with one of the contactors, 40, of the other multicontactor switch 32.

With the circuit as thus far described, the multicontactor time switch 32 will continue to advance at regular time intervals thus increasing the resistance in the circuit of its movable switch arm 39 and the multicontactor progress switch 33 will also continue to advance, until the movable arm 41 of this switch reaches the one active fixed contact 43. At the time this contact is made it completes circuits through conductors 44, 45, 46 and 48 which actuate three control switches 31, 51 and 54, one of which, the cut-out switch, 31 has already been mentioned and the others of which will be hereinafter described.

Each of these control switches is arranged so that it will operate in the proper time relation to the others and for the sake of simplicity these switches have been shown as consisting of a fixed contact, a second contact cooperating therewith and carried by a bimetal strip and a heater element arranged to warp the bimetal strip to actuate the switch. By properly proportioning the heating elements and placing heat insulation about the bimetal strips as needed the time constants of the switches may be varied as desired.

The cut-out switch 31, already mentioned, is normally closed but when the moving arm 41 of the switch 33 reaches the fixed contact 43 it completes a circuit from the battery 30 through conductors 44, 45, 48 and 46 and permits current to pass through a heater resistor 49 of the cut-out switch. At this time the bimetal strip immediately begins to warp and the cut-out switch is immediately opened and will remain open until the heating circuit is broken and sufficient time has elapsed for the bimetal strip to cool down. During this period the recording of the measurement made by the multicontact time switch 32 and the resetting of both time and progress switches 32 and 33 will have taken place without an interference from time or progress indicating pulses of current.

The recording of the time measurement is made through one of the three control switches mentioned. This switch hereafter will be designated as the recording switch 50. The switch 50 also is a time delay switch and has been shown as consisting of a bimetal strip having a contact on either side. A fixed contact normally contacts one of the contacts on the bimetal strip and a second fixed contact is normally just out of contact with the opposite contact on the strip. A heater resistance 51 is connected so that when the movable arm 41 and the fixed contact 43 of the progress switch 33 are together, current will pass through conductors 44, 45 and 46 from the battery 30, through the bimetal strip and the contact which touches it and through the resistor 51. The heat so generated will cause the bimetal strip to warp and break the circuit and immediately thereafter to strike the other fixed contact of the switch which it will continue to touch for a short period and then slowly return to its original position. The bimetal strip is so arranged, by insulating it or otherwise that its return to its original position will consume a sufficient length of time so that the other operations of the circuit will have been completed and contact between the contact arm 41 and its cooperating fixed contact 43 will have been broken by the time the normal contact of this switch has been reestablished. However, the length of time during which contact is made between the bimetal strip of the switch 50 and its normally separated contact will generally be relatively small. When this contact is made it completes a circuit 52 to a recorder 53 which records the amount of resistance in the circuit controlled by the movable switch arm 39 of the time switch 32. The tape of this recorder is driven by the motor 26 of the electrical transmission system so that the recording of time required for drilling a unit depth is directly correlated with an indication of the depth at which the drill is operating.

While the cut-out switch 31 is still open and the recorder switch 50 is in an intermediate position, a recording having been made and the bimetal strip being on its way back to its normal position, the third control switch which will hereafter be designated as the reset control switch 54 comes into operation. This switch also consists of a bimetal strip and a heating resistance and there is one contact carried by the bimetal strip and one contact that is fixed. In its normal position this switch is open and only after current has been flowing through the resistance for some little time does it close. When the movable switch arm 41 contacts the fixed contactor 43 of the progress switch 33 a circuit is completed through conductors 44, 45 and 46 from the battery 30 to operate the switch 54. After current has flowed through the resistance for long enough to sufficiently heat the bimetal strip, the switch 54 completes a circuit through each of the reset switch arms 40 and 42 of the multicontact switches 32 and 33, and from these arms through the shunted contacts that cooperate with them, to the actuating mechanism of the respective switches 32 and 33 and to the battery 30.

As a result of the current that flows in these circuits, the contact arms of each of the switches 32 and 33 is advanced one position. As this advance takes place the movable contactors 40 and 42 each breaks its respective circuit and then as it comes to rest on the next contact establishes it again. This results in a new impulse being sent to the actuating mechanism of each switch and the cycle is repeated until the switch arms 40 and 42 finally come to rest on the one contact that is not connected to the others. At that point both switches come to rest and are ready to begin a new cycle.

The recording switch 51 may be timed so that it comes back to its normal position at any time after the contact arm 41 leaves fixed the contact 43 but the cut-out switch 31 must be so timed that it will not return to its normal position until after the resetting of the switches 32 and 33 has been completed. Thereafter the cut-out switch 31 returns to its normal position and the cycle is repeated for a new measurement.

As will be appreciated by the foregoing description the recorder 53 will make an elapsed time record at the completion of each unit of depth. The unit of depth selected will correspond to the number of impulses necessary to cause the movable contact member 41 of the progress switch 33 to move from its zero or base position to the place where it contacts the fixed contact 43. The measurement recorded in correlation therewith will be of the exact time taken to drill this depth.

By means of the magnetically operated switch 34 which may be operated by hand, time-out will be taken whenever the drilling stops and the record will be an accurate one of the drilling time per unit of depth correlated with the depth at which the drill was working when the measurement was taken.

Because of the fact that minor irregularities at times obscure the more general trend if measurements of the foregoing type are made over small units of depth, and minor trends are not shown by measurements made over greater units of depth, it has been found desirable to have a device that will make measurements simultaneously over two units of depth of different length. In doing this, with the apparatus illustrated in Figure 2 of the drawings, it has been found possible not only to take a series of measurements each representing a short unit of depth and also to take a series of measurements each measurement of which represents a greater unit of depth, but also at the same time to make the longer units of depth overlapping. This smooths out the rate of drilling curve which results from the measurements over the greater or longer unit to such an extent that a very useful curve showing clearly the general trend and eliminating any confusion from the minor disturbances is produced on the one hand and a very detailed curve is produced on the other. Also, it has been found possible to so arrange the single recorder that it will record not only both of the measurements made by this device but will also record simultaneously any other measurements that are made as the drilling progresses, such as the viscosity or resistance of the drilling mud, either as it enters or as it leaves the well or both.

As in Figure 1 there is provided in the device illustrated in Figure 2 a timing commutator 101 driven by a constant speed source of power 102, a progress commutator 103 driven by a motor 104 of the electrical transmission system that is operated by the drilling equipment exactly as in Figure 1, and a recorder driven by a second motor 105 of the electrical transmission system.

In the device shown in Figure 2, however, there are three separate multicontact timing switches 106, 107 and 108 instead of a single timing switch 32 as was shown in Figure 1. The timing switches are identical with the timing switch shown in Figure 1 but the radially arranged resistors shown in that figure have been omitted in Figure 2 to conserve space.

As in Figure 1 there is a multicontact progress switch 109, but between this progress switch and the timing switches 106, 107 and 108 there is an additional switch 110 which will hereafter be designated the distribution switch. The distribution switch is shown as having a ratchet and four moving contactor arms 111, 112, 113 and 114 each contacting with only three fixed contacts.

Theoretically, each actuation of the advancing mechanism of the switch 110 moves the switch arms a third of a revolution, thus bringing them into contact with the next set of contacts. In actual practice the same type of switch is used here, however, as is used in the other positions and the desired effect is achieved by connecting the third, sixth, ninth, etc., fixed contacts of the switch together so that three circuits are produced. Each movement of the switch arm thus changes the circuit to which the switch arm is connected so as to bring it progressively into contact with one after the other of the three circuits.

Passing from left to right in the drawing the first movable switch arm 111 of the distributing switch controls the advancing pulses for the time switches 106, 107 and 108, the second movable arm 112 of the same switch controls the resetting currents to the time switches and the other two movable arms 113 and 114 control the connections from the resistances of the time switches that are used in the recording of time taken for each small unit of progress.

In operation a connection is made from the negative side of a battery 115 through a cut-out switch 116 which operates in the same manner as did the cut-out switch 49 in Figure 1, through a time-out switch 117 which also operates like its counterpart, time-out switch 34, in Figure 1, through the time commutator 101, through the switch arm 111 of the distributing switch to the operating coil of one of the time switches 106 or 107 or 108 and then to the positive side of the battery. As a result the time switch to which the impulse was directed is advanced one point and the resistance in its recorder controlling circuit raised accordingly. This continues until interrupted by action resulting from the operation of the progress commutator 103.

As the progress commutator 103 operates, a circuit is completed from the negative side of the battery 115 through the cut-out switch 116 and the progress commutator 103 to the actuating mechanism of the multicontact progress switch 109 and from there back to the positive side of the battery. Thus each time sufficient drilling progress is made to cause the commutator to make a new contact the progress switch 109 advances one point until eventually one of its moving arms 118 comes in contact with a fixed contact 119 which is connected to a circuit that actuates four controlling relays or switches 120, 130, 131 and 132. Each of these switches 31, 51 and 54 like the control switches described in connection with Figure 1 has a definite time constant so that it will perform its function in proper time relation to the other switches.

The cut-out switch 116 operates immediately to open the impulse circuit so that no more impulses will be delivered until the recording and resetting of the apparatus has been accomplished.

A recording control switch 120 which is normally closed permits the operation for a short time of a solenoid 121 which moves a double pole double throw switch 129 out of its normal position into a position where it closes a circuit through conductors 122, 123, 124, 125, 126 and 127 which includes all three of the time measuring resistances to a recorder 128 which is arranged to record the total resistance. Almost immediately, however, the switch 120 opens because of the heat generated in the resistance which is placed next to its bimetal spring arm and before the bimetal spring arm has cooled sufficiently to allow contact to again be made the recording cycle has been completed and contact broken at the progress switch 109.

After sufficient time has elapsed for the recording to have been made and the double throw double pole switch 129 to have resumed its normal position a reset switch 130 closes due to the heating of its bimetal strip in the same manner as caused the recorder control switch 120 to open. When this switch 130 closes current flows from the negative side of the battery 115 through it, through the reset switch arm 112 of the distribution switch 110 to the reset mechanism of the time switch 107 as shown in Figure 2, which is the next switch to be used for recording the passage of time. From the reset mechanism current is carried through the actuating mechanism and back to the battery so that the circuit is complete and the switch resets itself in the manner described above in connection with the switch 32 of Figure 1.

After this operation has taken place an actuating switch 131 operates to advance the distributing switch 110. This switch 131 works exactly in the same manner as does the reset control switch 130 but has a longer period of delay before operation. Upon operation it completes the circuit from the negative side of the battery 115 through the actuating mechanism for the distributing switch 110 and back to the positive side of the battery. This advances all of the contacts on the distributing switch 110 one point so that time pulses will thereafter go to the next timing switch, in this instance switch 107, and when the reset mechanism is again operated it will also operate the proper switch. Obviously, by the time this advancing mechanism operates the reset switch 130 must have operated and opened and does not operate again until the next cycle. To accomplish this the resistance of the reset control switch 130 may be placed close to the bimetal strip where it will heat it to a sufficient extent to cause the bimetal strip to bend against the fixed contact but so spaced that in bending against the fixed contact it will remove the bimetal strip a sufficient distance from the resistance so as to allow it to cool. Thus the bimetal strip will swing against the fixed contact 1 and will then after a short period of time fall away from it and assume an intermediate position where it will remain until the circuit through the resistor is broken and the resistor allowed to cool.

After these events have all transpired the relatively slow acting progress reset control switch 132 which is similar to the others except that it closes quite slowly after current is applied to its heating resistor, finally does close and connects the battery 115 to the actuating mechanism of the progress switch 109. This effects a resetting of the progress switch to the zero position and thus a new cycle is ready to begin as soon as the cut-out switch 116 closes. At this time the switch 107 which is to receive the time impulses has been cleared and reset to zero but the other two time switches 106 and 108 still retain their settings so that at the end of the next cycle when the resistance across all three time switches is recorded it will represent the time consumed in the drilling of the last three units of depth.

Since it is desired along with the records of the time consumed in the drilling of each last three units to also record other data including a record of the time consumed in the drilling of each individual unit the double throw double pole switch 129 which connects the recorder 128 to other parts of the circuit is normally biased to connect the recorder to a circuit which includes the two selector switches 113 and 114 which form a part of the distribution switch 110 and also a third selector switch 133 which may be driven at a constant speed to periodically select various circuits for connection to the recorder so that it will record various other data. One of the leads 134 from the double pole double throw switch leads directly to this constantly driven selector switch 133 and when this switch is in one of its several positions a connection 135 leads from that switch to the movable contactor of one of the selector switches 113 which is a part of the distribution switch 110. Another lead 136 passes directly from the double pole double throw switch 129 to the other selector switch 114, also forming a part of the distribution switch 110. When other data than that obtainable from the present apparatus is to be recorded the leads from the auxiliary apparatus are connected to the various contacts on the selector switch 133 and to the lead 136. Thus when the selector switch 133 makes the proper contact this data is recorded. Recorders are relatively well known that will record a number of different data as individual spaced dots on the recording tape and by using such a recorder, which usually incorporates a switch such as selector switch 133, the present type of recording may be made with a standard instrument with very little modification.

From the movable contactors of the selector switches 113 and 114 appropriate connections are made so that the resistance of the last used time switch will always be placed in the circuit with the recorder when the time comes to record the time consumed during the smaller unit of progress. Thus the time consumed for the small unit of progress will be recorded as a fixed amount until a new unit of progress has been completed at which time a recording will be made of the time consumed in drilling the last three units and thereafter the time recorded for the drilling of one unit will be changed so as to be that of the last completed unit.

The device of Figure 3 is still a different embodiment of the principles of the present invention. In this embodiment an arrangement is provided that will give a continuous, as distinguished from a step by step, record of the time taken to drill the last unit or series of units of depth. The device has the additional advantage that where a measurement is to be made over a small unit of depth and also over a large unit of depth at the same time, the large unit of depth does not have to be an exact multiple of the smaller unit of depth and yet both measurements can be simultaneously recorded on the same recorder by the same equipment.

As illustrated the device has a timing mechanism, a progress measuring mechanism and a recorder as do the devices illustrated in Figures 1 and 2. The timing mechanism is similar to those illustrated in the preceding figures in that it comprises a commutator or contactor device 201 which is driven by a constant speed mechanism 202 which may be of any desired type. The progress measuring mechanism, however, is somewhat different from the device illustrated in Figure 2 in that it comprises a perforable tape 203 carried on a pair of rolls 204, one of which is driven by a motor 205 of a "Selsyn" system, similar to those that drive the progress mechanism in the devices of Figures 1 and 2. A recorder 206 is arranged to be driven by the same "Selsyn" motor by being connected to the same shaft.

In series with the timing commutator 201 is a battery 207, a time-out switch 208 which operates in the same manner as the time-out switches 34 and 117 in the devices of Figures 1 and 2, and a perforator 209 that operates at a fixed position relative to the moving perforable tape 203 and serves to make a perforation in the tape each time contact is made by the timing contactor 201. Thus as the drilling progresses a series of perforations appear in the tape and the distance between these perforations depends upon the rate of progress of the drill in the hole. As the drill progresses more rapidly the perforations are spaced further apart because the tape is moving more rapidly whereas, on the other hand, as the drill progresses more slowly the perforations are placed closer together because the tape moves more slowly.

Spaced from the time operated perforator 209 along the perforable strip 203 are two sets of contactors 210 and 211. Each set of contactors comprises one contact below the strip and one above the strip so arranged that they make contact with each other only when a perforation occurs in the strip. The set of contactors 210 which are closest to the perforator operate the mechanism for determining the rate of progress of drilling over a relatively short unit of depth whereas the pair of contactors 211 which are further spaced from the perforator operate mechanism for determining the rate of progress over a greater unit of depth.

The spacing between the perforator and the two sets of contactors determine the lengths of the units of depth over which progress is to be measured and may be whatever is desired. The sets of contactors 210 and 211 operate by being connected through the operating mechanism of advancing relays 212 and 213 respectively, so as to complete circuits through the advancing mechanisms of these relays and through the time-out switch 208 to the battery 207. Thus, each time contact is made by one of the sets of contactors through a perforation in the strip 203 the corresponding relay advances one position. A relay 214 is also provided and connected in series with the timing commutator 201, the time-out switch 208 and the battery 207 so as to be operated each time the timing commutator makes contact.

Between the advancing relay 214 for the timing mechanism and the advancing mechanism 212 for the short unit of progress measurement is a differential mechanism 215, the output of which is connected to variable resistance 216' in such a manner that the advancing of the relay 214 which is advanced by time pulses tends to increase the resistance and the advancing of the relay 212 which advances in response to progress indications tends to reduce the resistance. Similarly a differential mechanism 216 is located between the timing relay 214 and the relay 213 operated in response to the greater unit of progress and this differential drives a second variable resistance 217 in a similar manner.

With such an arrangement, the number of impulses will be exactly the same from the timing mechanism and from the progress contactors 210 and 211 unless there are perforations existing in the moving tape that have not yet reached these contacts. Under such circumstances both of the variable resistances 216' and 217 would be at zero and this would indicate a rate of drilling so high that any perforations made by the timing mechanism arrived at the progress measuring contact at too short a time thereafter to be measured, in other words, theoretically, an infinite speed of drilling.

As the speed of drilling is lower than infinite there will at all times in the normal operation of the device be some perforations in the tape between the perforating device 209 and the contactors 210 and 211 and the number of these perforations is dependent upon the length of time that has elapsed during the drilling of the last large or small unit, depending upon whether the perforations counted are between the closer contactors and the perforator or between the contacts further on and the perforator. The number of perforations existing between the perforator and the contactors will be indicated by the relative positions of the time and progress relays and hence by the settings of the variable resistances 216' and 217. By connecting a recorder operating mechanism 218 across the resistance 216 and the second recorder operating mechanism 219 across the resistor 217 and so arranging these recording mechanisms that they will operate in response to the resistances in their circuits, records may be made on the recorder 206 that will continuously indicate the time consumed in the drilling of the last small and large unit of depth respectively. Also, because the recorder tape of the recorder 206 is driven in accordance with the progress of the drill the result will be records of rate of progress correlated to the depth of the operation.

The foregoing illustrated embodiments will furnish a few specific examples of the application of the general principles of this invention and serve to illustrate its preferred forms. However, there are so many obvious modifications possible of the devices specifically described that it must be understood that the invention is not limited except as indicated by the scope of the appended claims.

I claim:

1. Apparatus for measuring and recording the rate of progress of earth boring operation in correlation with the depth at which the operation is taking place that comprises means for operating said apparatus in accordance with the movement of the drill vertically in the earth, means for generating electrical impulses at regularly spaced time intervals during the drilling operation, a series of multicontact electrical switches, means to advance said switches a step at a time in response to electrical impulses such as those generated by said previously mentioned means, control means for selecting one switch from said series of switches to receive said impulses and thus be advanced, means driven in accordance with the progress of the drill and operable after a predetermined amount of progress to change the control means so as to select a new multicontact switch, means to reset each of said multicontact switches just prior to its use, a series of resistors connected between the contacts of each of said multicontact switches so as to make of it a variable resistance, a record sheet advancing means, means to drive said record sheet advancing means in accordance with the vertical progress of the drill, means to record on the record sheet of said record sheet advancing means the resistance at which the last used multicontact switch is set, and means to record just prior to the resetting of each multicontact switch the total resistance for which a plurality of said switches are set after a predetermined unit of operation is progressed.

2. A device as described in claim 3 in which the means for recording the time impulses comprises a perforable insulating sheet movable by said recorder operating means and means for perforating the portions of a sheet passing a fixed point at the time the impulse is generated.

3. Apparatus to measure rate of drilling of a well bore that comprises means for generating a first series of uniformly pulsating electrical timing signals; means for generating a second series of electrical signals corresponding to unit increments of drilling; means actuated by said second series of electrical signals in accordance with the number of units of depth drilled; means actuated in accordance with the number of said first electrical signals occurring during the time required to progress said units of depth, means for interrupting both of said series of electrical signals; means movable in accordance with the depth of the drilling operations; and means for recording the number of units of depth drilled and the number of said timing signals in correlation with depth.

SERGE ALEXANDER SCHERBATSKOY.